Dec. 30, 1924.
G. PIELSTICK
1,521,388
PISTON AND PISTON ROD OF INTERNAL COMBUSTION ENGINES
Filed June 29, 1921
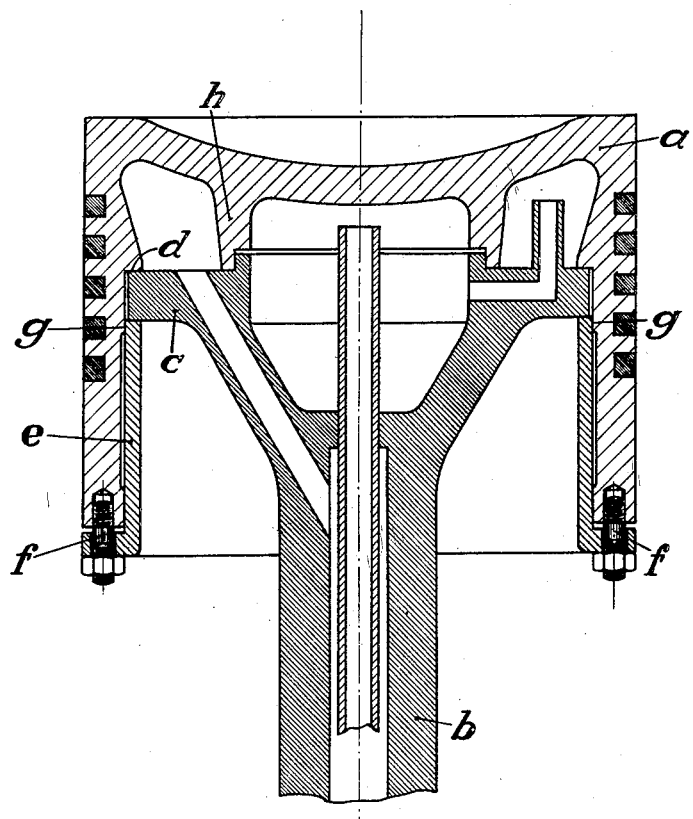

Patented Dec. 30, 1924.

1,521,388

UNITED STATES PATENT OFFICE.

GUSTAV PIELSTICK, OF AUGSBURG, GERMANY, ASSIGNOR TO THE FIRM MASCHINENFABRIK AUGSBURG-NUERNBERG, AKTIENGESELLSCHAFT, OF AUGSBURG, GERMANY, A CORPORATION OF GERMANY.

PISTON AND PISTON ROD OF INTERNAL-COMBUSTION ENGINES.

Application filed June 29, 1921. Serial No. 481,327.

(GRANTED UNDER THE PROVISIONS OF THE ACT OF MARCH 3, 1921, 41 STAT. L., 1313.)

*To all whom it may concern:*

Be it known that I, GUSTAV PIELSTICK, a citizen of the German Republic, residing at Augsburg, Germany, have invented certain new and useful Improvements in Pistons and Piston Rods of Internal-Combustion Engines, of which the following is a specification.

This invention relates to the pistons and piston rods of internal combustion engines and it particularly concerns the connection between these two parts.

In crosshead engines it is the rule to form the one end of the piston rod into a flange which is subsequently bolted to the inner wall of the piston. This known arrangement, however, has several disadvantages, one of which is that the connection bolts frequently break owing to their uneven heat stresses and owing to the expansion of the piston during work. Besides of this and as it is necessary to provide the piston with annular bosses for the reception of the connection bolts, accumulations of material occur at the bases of these bosses which give rise to very injurious casting stresses which, in addition to the stresses due to the heat in the engine when working, are apt to rupture the piston and the connection bolts.

With the object of avoiding these disadvantages the invention mainly consists in a novel manner of fixing the piston to the piston rod. According to the invention, therefore, the piston rod rests with its flanged end against a correspondingly shaped shoulder in the piston; an annular sleeve which is fastened to the rim of the piston skirt serving to press the said flange firmly against the shoulder in the piston.

In the accompanying drawing one constructional form of the invention is shown by way of example.

The piston is denoted by the letter $a$ and the piston rod by $b$. The latter is provided with a flange-like extension $c$ which is adapted to rest against a shoulder $d$ of the piston. An annular sleeve $e$ is introduced into the piston $a$ and, with its free end, extends beyond that end of the piston which is directed towards the piston rod. Nuts, which fit upon the threaded pegs fixed in the rim of the piston skirt serve to press the said sleeve against the flange-like end of the piston rod, whereby the two parts, namely, the piston and the piston rod, are firmly united to each other. By making the flange on the sleeve $e$ relatively thin, a connection of some resiliency is afforded between the piston and the piston rod. The pressure with which this connection is effected may easily be varied by tightening up the bolts $f$ to a greater or lesser extent.

In this new manner of fixing the piston to the piston rod a destruction of the connection owing to heat expansion in the body of the piston or to alternating strains and stresses in the connecting means is impossible. The piston may be made of a casting with walls of approximately even thickness throughout as the shoulders $d$ need only be very narrow in width. A rupture of the piston owing to excessive heat strains need not, therefore, be feared.

It is preferable to provide the internal wall of the piston skirt with machined bearing surfaces $g$ against which the sleeve $e$ is adapted to rest. In this way it is possible, in case of unequal expansion in the two parts, for the one part to slide in relation to the other. Preferably the sleeve $e$ is screwed to the piston so as to resiliently press the two parts together, and to effectually prevent any loosening of the connection, even if the material of the piston $a$ should expand more than the material of the flange $c$ and the sleeve $e$. It is also advantageous to brace the piston head internally by the provision of webs $h$ against which the piston rod would be adapted to rest as is clearly shown in the drawing. The connection bolts $f$ according to the invention are easily accessible, whereby the further advantage is obtained that the piston may be detached from the piston rod in the most simple manner, which, as is known, becomes necessary from time to time in order to be able to properly clean the piston.

What I claim is:

1. In an internal combustion engine, a piston and a piston rod terminating in a flange-like extension, a shoulder formed in the side wall of the piston adapted to be engaged by said extension, and resilient means engaging said extension and serving to maintain it against the shoulder.

2. In an internal combustion engine, a piston, a piston rod having a flanged end integral with said rod, a cooperating portion within and on said piston for engaging with said flanged end and a sleeve-like member attached at one end to the piston skirt and at the other engaging the flanged end of the rod to hold said end against the cooperating portion of the piston.

3. In an internal conbustion engine the combination with a piston and a piston rod, a flange-like end to said piston rod, an internal shoulder in the piston to correspond with the said flange-like end of the piston rod, a sleeve to press the two parts firmly together, machined bearing surfaces in the piston to guide the said sleeve, bolts and nuts to adjustably connect the said sleeve to the piston, and a substantially annular internal web at the piston head to form an additional bearing surface for the flange-like end of the piston rod.

4. In an internal combustion engine the combination with a piston and a piston rod, walls of substantially even thickness in the said piston, a flange-like extended end to the piston rod in communication with an internal shoulder in the piston, a sleeve to bear on the said flanged end, and means to secure the said sleeve so as to resiliently press the flanged end of the piston rod against the shoulder in the piston.

5. In an internal combustion engine, a piston, a piston rod having a flanged end integral with said rod, a cooperating portion within said piston for engaging the said flanged end, a sleeve coaxial with the piston and having one end bearing against the flanged end of the piston rod and means mounted on the rim of the piston skirt and serving to hold the flanged end of the rod against the cooperating portion of the piston by means of said sleeve.

6. In an internal combustion engine, a piston, a piston rod having a flanged end integral with said rod, a cooperating portion within said piston for engaging the said flanged end, a sleeve within said piston and extending to the outer end thereof, a portion of said sleeve overlapping the outer end of the piston, and means for effecting a connection between the overlapping portion of said sleeve and the body of the piston.

7. In an internal combustion engine, a piston, a piston rod having a flanged end integral with said rod, a cooperating portion within said piston for engaging the said flanged end, a sleeve within the piston and extending to the outer end thereof, a portion of said sleeve overlapping the outer end of the piston, and means for effecting a resilient connection between said piston rod and piston whereby the pressure between the contacting surfaces may be regulated.

In testimony whereof I have hereunto set my hand in the presence of two subscribing witnesses.

GUSTAV PIELSTICK.

Witnesses:
  PAUL DREY,
  RICHARD LUTZ.